(12) United States Patent
Takagi et al.

(10) Patent No.: US 8,098,218 B2
(45) Date of Patent: Jan. 17, 2012

(54) PLASMA DISPLAY DEVICE AND METHOD OF DRIVING THE SAME

(75) Inventors: Akihiro Takagi, Kawaguchi (JP); Takashi Sasaki, Hiratsuka (JP); Akira Otsuka, Zama (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 1081 days.

(21) Appl. No.: 11/331,348

(22) Filed: Jan. 13, 2006

(65) Prior Publication Data

US 2006/0170621 A1    Aug. 3, 2006

(30) Foreign Application Priority Data

Jan. 13, 2005  (JP) ................. 2005-006478

(51) Int. Cl.
G09G 3/28   (2006.01)
(52) U.S. Cl. .......................................... 345/67
(58) Field of Classification Search .............. 345/60–69, 345/41, 42, 78, 207, 211–213
See application file for complete search history.

(56) References Cited

U.S. PATENT DOCUMENTS

| | | |
|---|---|---|
| 6,548,962 B1 | 4/2003 | Shiokawa et al. |
| 6,628,077 B2 | 9/2003 | Shirozu |
| 6,882,114 B2 * | 4/2005 | Takamori et al. ........... 315/169.4 |
| 7,045,962 B1 * | 5/2006 | Murai et al. .................... 313/582 |
| 7,358,671 B2 * | 4/2008 | Kwon et al. .................... 313/584 |
| 2002/0027417 A1 * | 3/2002 | Mori et al. ..................... 313/582 |
| 2002/0050792 A1 | 5/2002 | Shirozu |
| 2002/0105278 A1 * | 8/2002 | Kanazawa ................. 315/169.3 |
| 2003/0179160 A1 * | 9/2003 | Yamamoto et al. .............. 345/60 |

FOREIGN PATENT DOCUMENTS

| | | |
|---|---|---|
| EP | 1 489 587 A2 | 12/2004 |
| JP | 63-149053 | 9/1988 |
| JP | 4-267293 | 9/1992 |
| JP | 11-126561 | 5/1999 |
| JP | 2002-203487 | 7/2002 |
| KR | 2003-0041059 | 5/2003 |
| KR | 2003-0080115 | 10/2003 |
| KR | 10-2004-0006573 | 1/2004 |
| KR | 10-2004-0110963 | 12/2004 |

* cited by examiner

*Primary Examiner* — Chanh Nguyen
*Assistant Examiner* — Tsegaye Seyoum
(74) *Attorney, Agent, or Firm* — Staas & Halsey LLP

(57) ABSTRACT

A plasma display device includes a first electrode from which sustain discharge occurs; a second electrode from which sustain discharge occur to the first electrode, a distance from the second electrode to the first electrode continuously varying in one discharge space; and a driving circuit which generates a sustain discharge pulse that rises in two stages, with an application time of a second-stage voltage being longer than an application time of a first-stage voltage, to apply the sustain discharge pulse between the first and second electrodes, thereby causing the sustain discharge.

6 Claims, 11 Drawing Sheets

F I G. 1
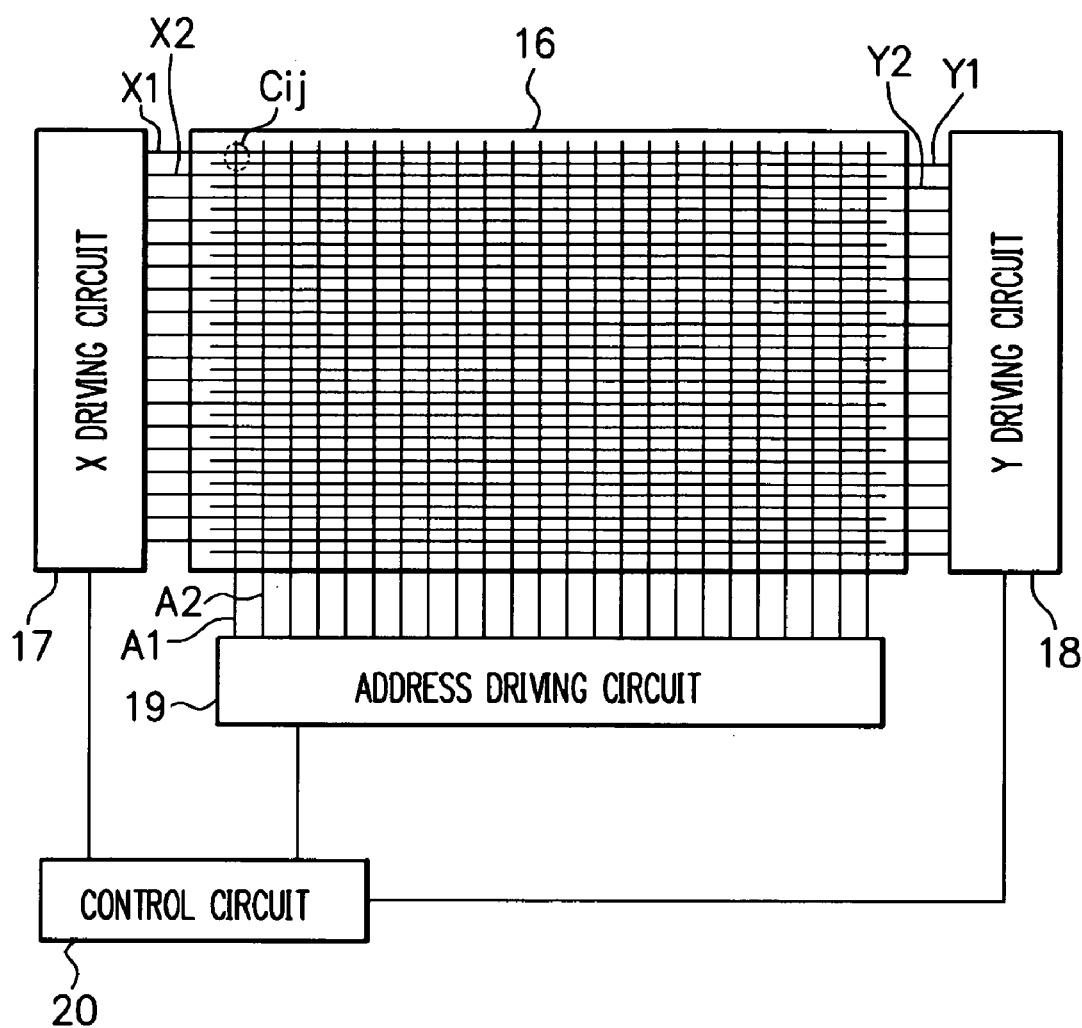

F I G. 3
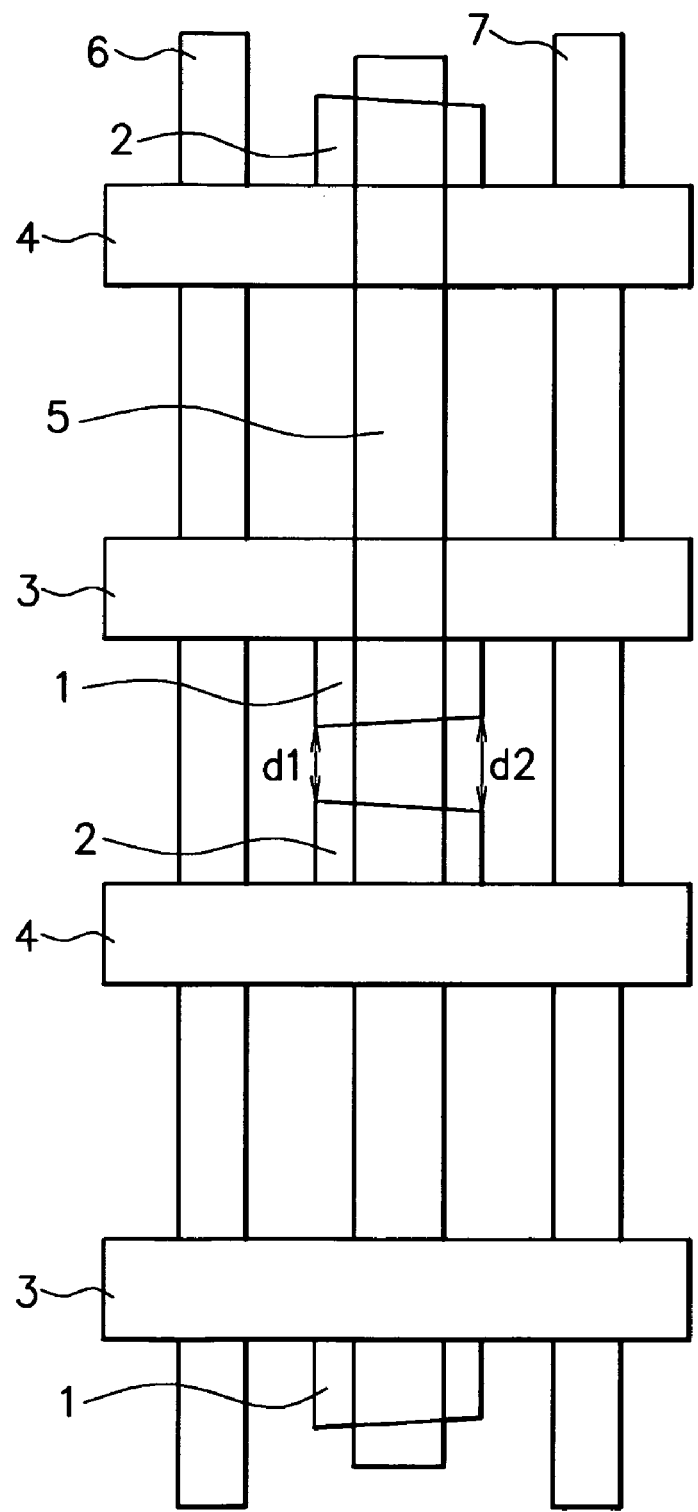

F I G. 7A
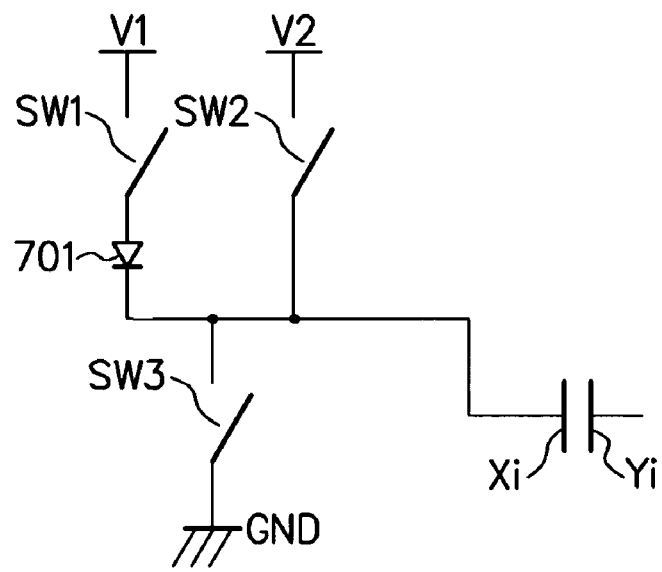
F I G. 7B
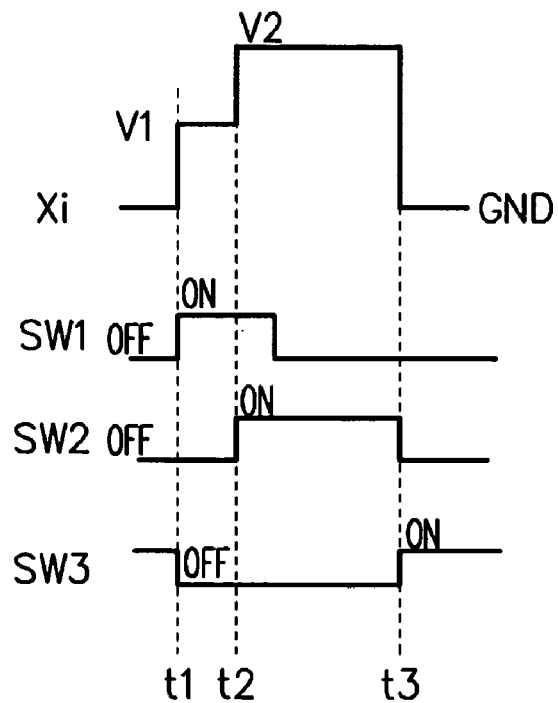

F I G. 9A
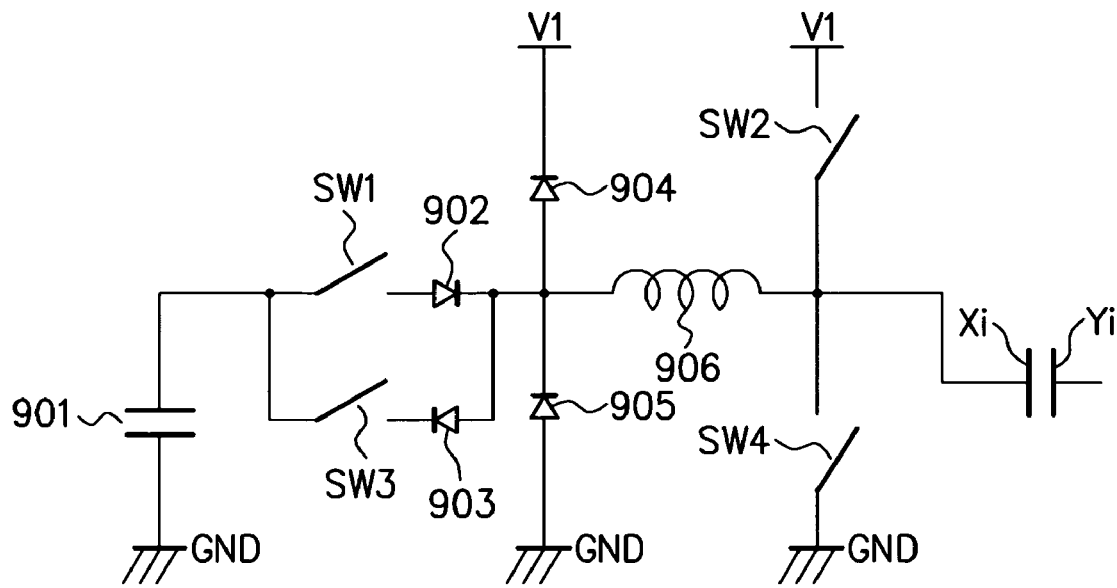
F I G. 9B
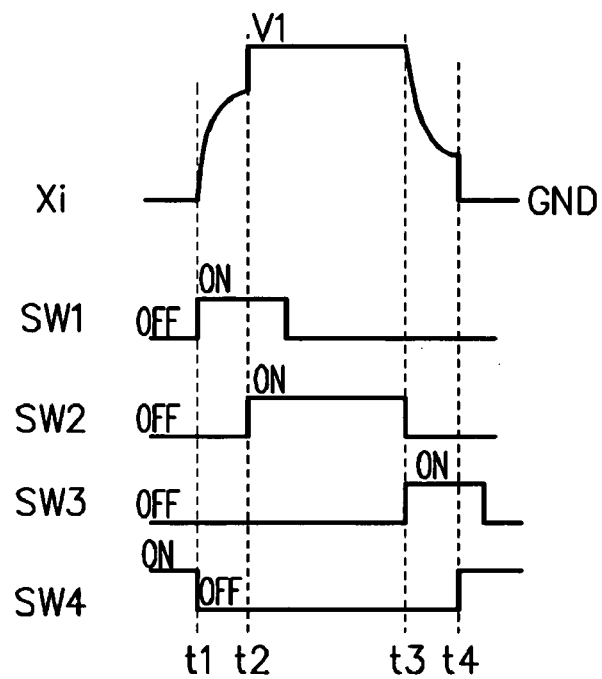

F I G. 10
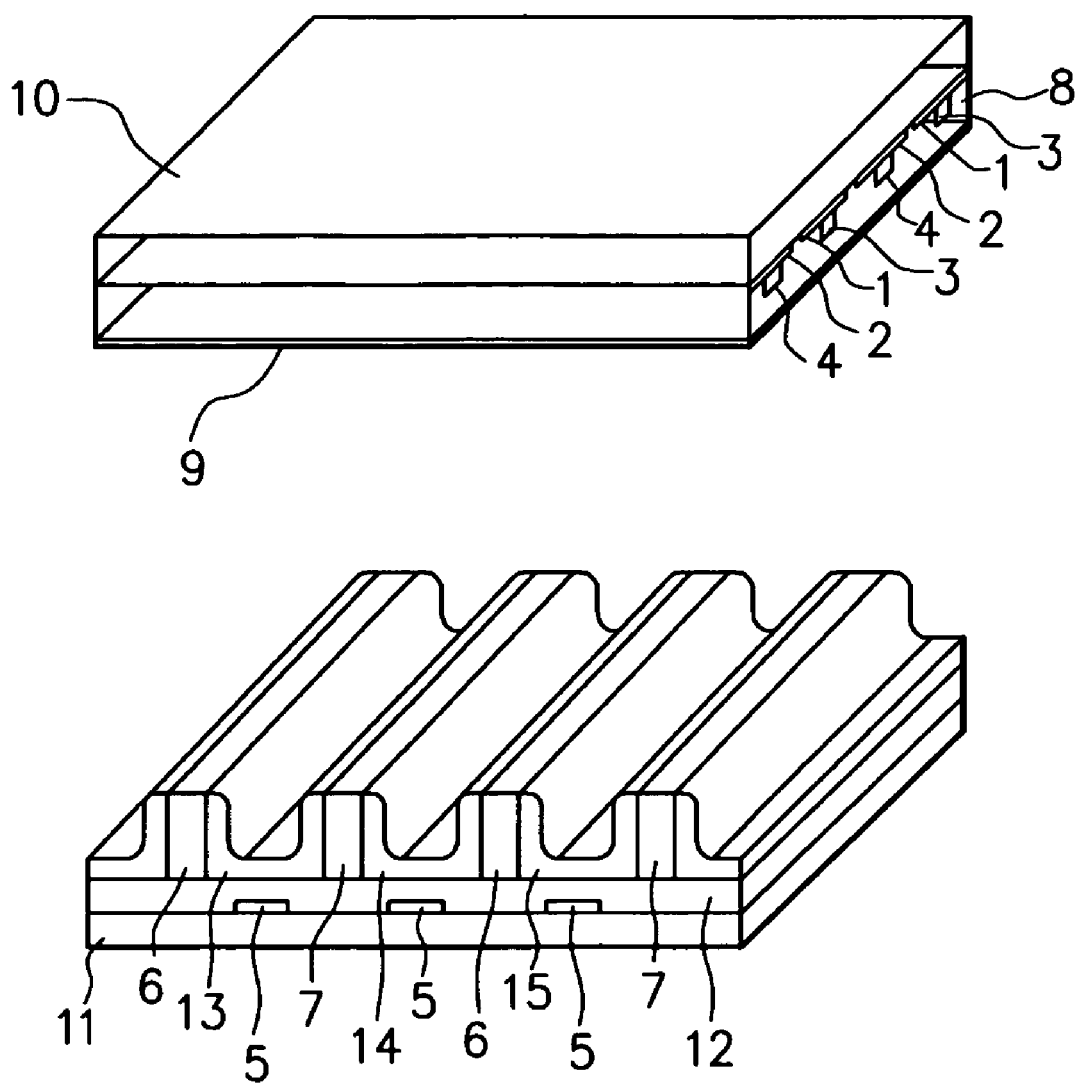

PLASMA DISPLAY DEVICE AND METHOD OF DRIVING THE SAME

CROSS-REFERENCE TO RELATED APPLICATIONS

This application is based upon and claims the benefit of priority from the prior Japanese Patent Application No. 2005-006478, filed on Jan. 13, 2005, the entire contents of which are incorporated herein by reference.

BACKGROUND OF THE INVENTION

1. Field of the Invention

The present invention relates to a plasma display device and a method of driving the same.

2. Description of the Related Art

Japanese Patent Application Laid-open No. Hei 4-267293 describes a gas discharge display element which utilizes an ultraviolet light generated by gas discharge to excite phosphors, thereby obtaining color light emission. This gas discharge display element has a pair of electrodes with two discharge gaps in one discharge space. In a first discharge gap, discharge having a stable memory function occurs, and in a second discharge gap, discharge by a short pulse voltage occurs, using the discharge in the first discharge gap as a trigger. To obtain such discharge, the short pulse voltage is superposed on a waveform and a voltage pulse with this waveform is applied.

However, there unavoidably occurs manufacturing variation in the first and second discharge gaps, resulting in variation in the first and second discharge gaps among electrode pairs even in the same gas discharge element. Due to the variation in the first discharge gap, the discharge having the stable memory function is not feasible in the first discharge gap. Further, due to the variation in the second discharge gap, the stable discharge in the second discharge gap using the discharge in the first discharge gap as the trigger is not feasible.

SUMMARY OF THE INVENTION

It is an object of the present invention to provide a plasma display device and a method of driving the same which realize stable discharge to improve light emission efficiency.

According to the present invention, provided is a plasma display device including: a first electrode from which sustain discharge occurs; a second electrode from which sustain discharge occurs to the first electrode, a distance from the second electrode to the first electrode continuously varying in one discharge space; and a driving circuit which generates a sustain discharge pulse that rises in two stages, with an application time of a second-stage voltage being longer than an application time of a first-stage voltage, to apply the sustain discharge pulse between the first and second electrodes, thereby causing the sustain discharge.

BRIEF DESCRIPTION OF THE DRAWINGS

FIG. 1 is a view showing a structural example of a plasma display device according to an embodiment of the present invention;

FIG. 3 is a partial plane view showing a structural example of the panel according to this embodiment;

FIG. 7A is a circuit diagram showing a configuration example of a clamp circuit for two-stage discharge having a voltage source of two-value voltages, and FIG. 7B is a timing chart showing its circuit operations;

FIG. 9A is a circuit diagram showing a configuration example of a clamp circuit for two-stage discharge utilizing LC resonance, and FIG. 9B is a timing chart showing its circuit operations;

FIG. 10 is an exploded partial perspective view showing a structural example of an ALIS panel.

DETAILED DESCRIPTION OF THE PREFERRED EMBODIMENTS

Figure 2:
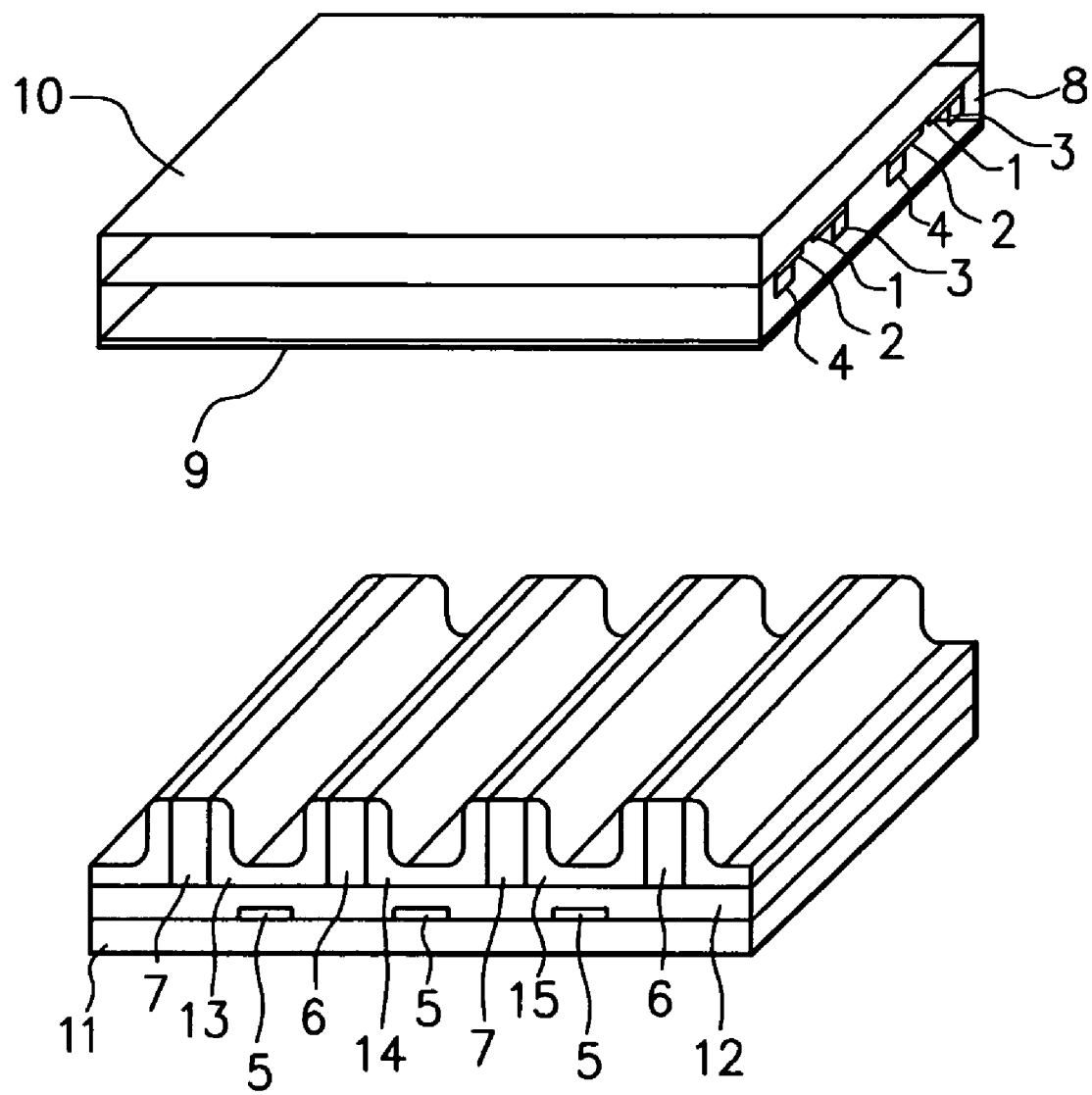
FIG. 2 is an exploded partial perspective view showing a structural example of a panel according to this embodiment.

FIG. 1 is a view showing a structural example of a plasma display device according to an embodiment of the present invention. The reference numeral 16 denotes a plasma display panel, the reference numeral 17 an X driving circuit, the reference numeral 18 a Y driving circuit, the reference numeral 19 an address driving circuit, and the reference numeral 20 a control circuit, respectively.

The control circuit 20 controls the X driving circuit 17, the Y driving circuit 18, and the address driving circuit 19. The X driving circuit 17 supplies a predetermined voltage to a plurality of X electrodes X1, X2, . . . . Hereinafter, an X electrode Xi is used to represent each of the X electrodes X1, X2, . . . or to collectively represent them. "i" is a suffix. The Y driving circuit 18 supplies a predetermined voltage to a plurality of Y electrodes Y1, Y2, . . . . Hereinafter, a Y electrode Yi is used to represent each of the Y electrodes Y1, Y2, . . . , or to collectively represent them. "i" is a suffix. The address driving circuit 19 supplies a predetermined voltage to a plurality of address electrodes A1, A2, . . . . Hereinafter, an address electrode Aj is used to represent each of the address electrodes A1, A2, . . . or to collectively represent them. "j" is a suffix.

In the panel 16, the Y electrodes Yi and the X electrodes Xi form rows extending in parallel in a horizontal direction, and the address electrodes Aj form columns extending in a vertical direction. The Y electrodes Yi and the X electrodes Xi are alternately arranged in the vertical direction. The Y electrodes Yi and the address electrodes Aj form a two-dimensional matrix of i-rows and j-columns. Each of display cells Cij is formed by an intersection of the Y electrode Yi and the address electrode Aj and the corresponding X electrode Xi adjacent thereto. This display cell Cij corresponds to a pixel, and the panel 16 can display a two-dimensional image.

FIG. 2 is an exploded partial perspective view showing a structural example of the panel 16 according to this embodiment, and FIG. 3 is a partial plane view showing the structural example of the panel 16 according to this embodiment. The reference numerals 6 and 7 denote ribs, the reference numeral 8 a first dielectric layer, the reference numeral 9 a protective layer, the reference numeral 10 a front glass substrate, the reference numeral 11 a rear glass substrate, the reference numeral 12 a second dielectric layer, the reference numerals 13, 14, 15 phosphors, respectively.

X light-transmissive electrodes 1 are connected to X bus electrodes 3. The X light-transmissive electrodes 1 and the X bus electrodes 3 correspond to the X electrodes Xi in FIG. 1. Y light-transmissive electrodes 2 are connected to Y bus electrodes 4. The Y light-transmissive electrodes 2 and the Y bus electrodes 4 correspond to the Y electrodes Yi in FIG. 1. In all the display cells in the panel 16, a distance between the X electrode 1 and the Y electrode 2 continuously varies within a range from a minimum value d1 to a maximum value d2 in one discharge space (one display cell). Address electrodes 5 correspond to the address electrodes Aj in FIG. 1.

The X electrodes 1, 3 and the Y electrodes 2, 4 are formed on the front glass substrate 10 and are covered with the first dielectric layer 8 for insulation from the discharge space. The MgO (magnesium oxide) protective layer 9 is further disposed thereon. The address electrodes 5 are formed on the rear glass substrate 11 facing the front glass substrate 10 and are covered with the second dielectric layer 12. Further, the phosphors 13 to 15 are disposed thereon. Inner surfaces of the ribs 6, 7 are coated with the phosphors 13 to 15 in red, blue, and green arranged in stripes. The phosphors 13 to 15 are excited by sustain discharge between the X electrodes 1 and the Y electrode 2 to emit lights in the respective colors. The discharge space between the front glass substrate 10 and the rear glass substrate 11 is filled with Ne+Xe penning gas (discharge gas) or the like.

Figure 4:
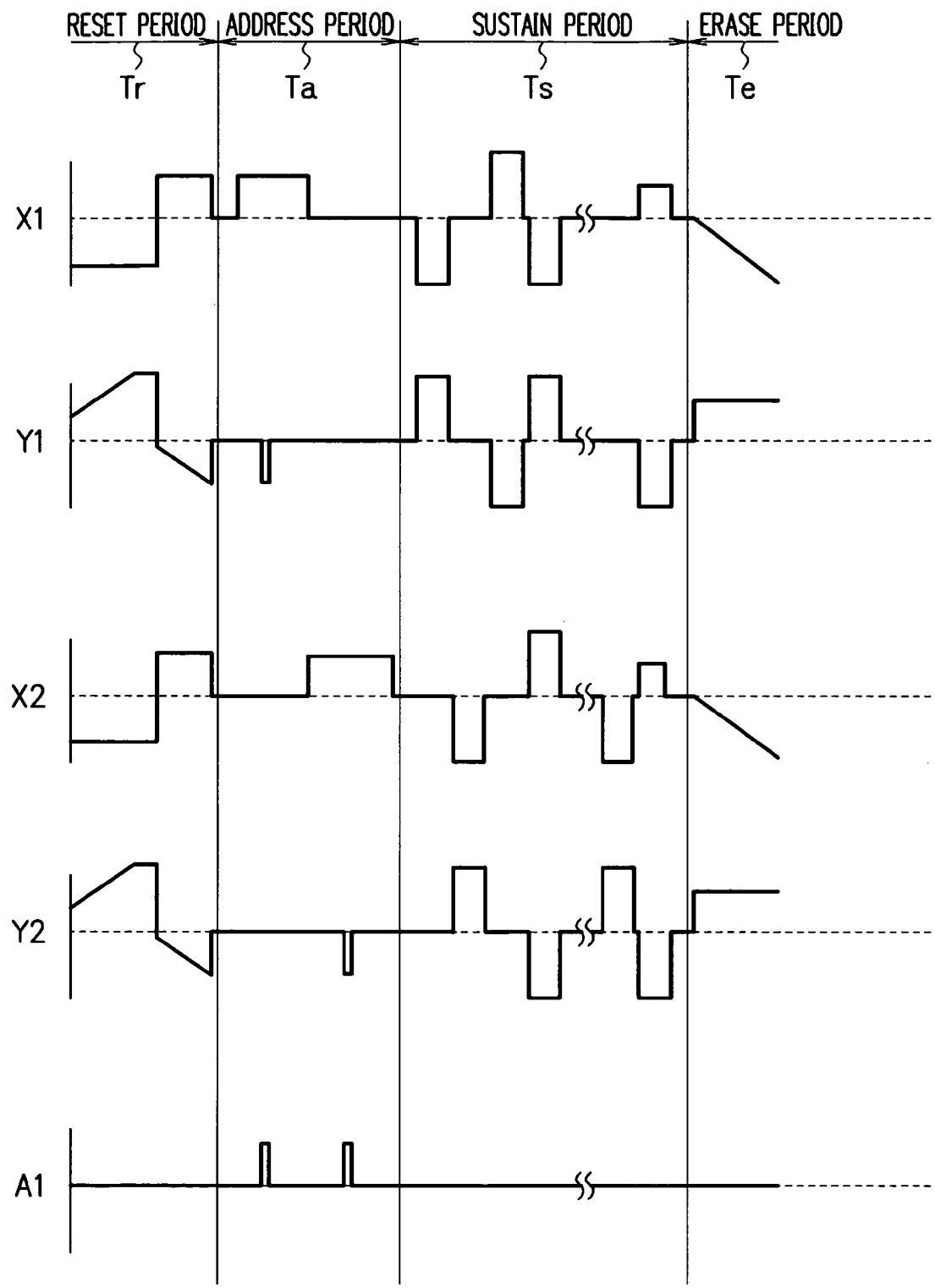
FIG. 4 is a waveform chart showing examples of voltages applied to X electrodes, Y electrodes, and an address electrode.

FIG. 4 is a waveform chart showing examples of voltages applied to the X electrodes Xi, the Y electrodes Yi, and the address electrode Aj. In a reset period Tr, predetermined voltages are applied to the X electrodes Xi and the Y electrodes Yi to initialize the display cells Cij.

In an address period Ta, the Y electrodes Y1, Y2, . . . are sequentially scanned to be impressed with a scan pulse, and an address pulse corresponding to the scan pulse is applied to the address electrode Aj, so that a display pixel is selected. If the address pulse to the address electrode Aj is generated in response to the scan pulse to the Y electrode Yi, the display cell corresponding to the Y electrode Yi and X electrode Xi is selected. If the address pulse to the address electrode Aj is not generated in response to the scan pulse to the Y electrode Yi, the display cell corresponding to these Y electrode Yi and X electrode Xi is not selected. When the address pulse is generated in response to the scan pulse, address discharge occurs between the address electrode Aj and the Y electrode Yi, which triggers the occurrence of the discharge between the X electrode Xi and the Y electrode Yi, so that the vicinity of the X electrode Xi is negatively charged and the vicinity of the Y electrode Yi is positively charged.

In a sustain (sustain discharge) period Ts, sustain discharge pulses in reversed phases are applied to the X electrode Xi and the Y electrode Yi, which causes sustain discharge between the X electrode Xi and the Y electrode Yi corresponding to the selected display cell to cause light emission. The application of the plural sustain discharge pulses causes a plurality of times of the discharges, which become the sustain discharge.

In an erase period Te, predetermined voltages are applied to the X electrode Xi and the Y electrode Yi to erase the charges in the vicinity of the X electrode Xi and the Y electrode Yi.

Figure 5:
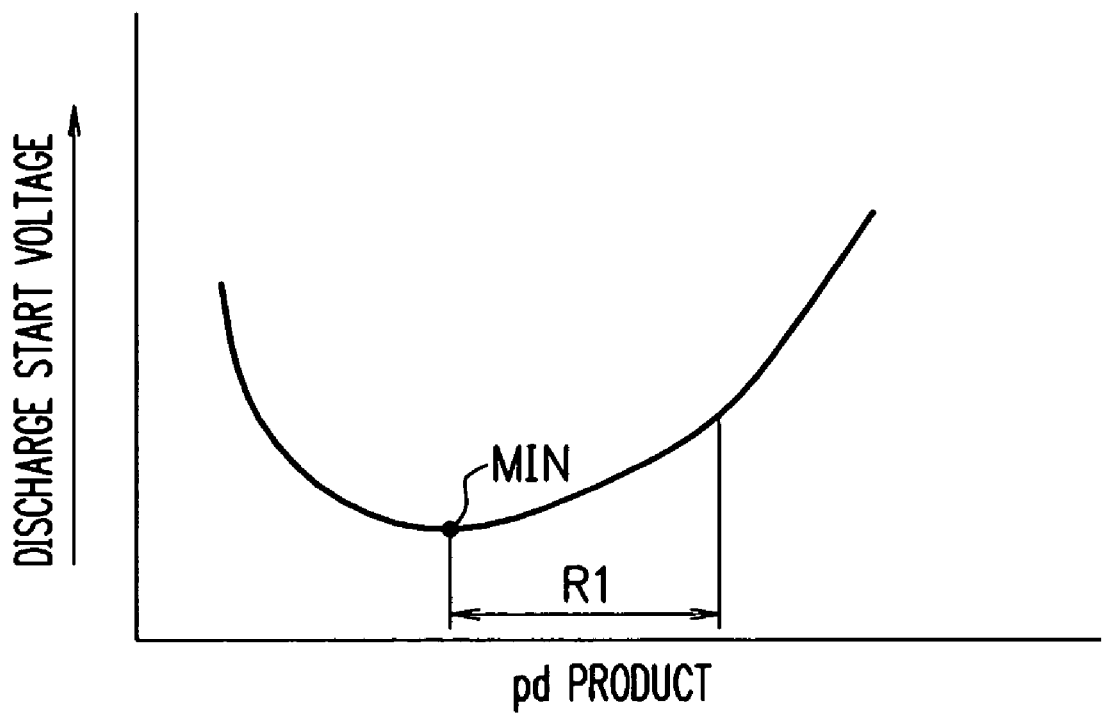
FIG. 5 is a graph showing the correlation between a pd product and a discharge start voltage.

FIG. 5 is a graph showing the correlation between a pd product and a discharge start voltage. The horizontal axis shows the pd product and the vertical axis shows the discharge start voltage between the X electrode and the Y electrode. Here, d is a distance between the X electrode 1 and the Y electrode 2, and p is pressure of the discharge gas.

First, a case where the distance d between the X electrode 1 and the Y electrode 2 in FIG. 3 is supposed to be a constant value will be described. According to the Paschen's law, there exists a point of the pd product where the discharge start voltage becomes an extremely small value (minimum value). This point MIN is the minimum value of the Paschen's law and is called a Paschen minimum. The operation at this Paschen minimum MIN achieves the highest light emission efficiency.

If the distance d is a constant value, a design value of the pd product is the same in all the display cells Cij. However, as a plasma display comes to have a larger screen and a higher definition, manufacturing variation in the distance d becomes larger. Accordingly, the discharge start voltage dependent on the pd product varies among the display cells Cij. Further, due to this variation in the distance d, the pd product is set to a value at which the discharge start voltage is higher than the Paschen minimum MIN. This results in the discharge at a voltage higher than the Paschen minimum MIN, which reduces an effect of improving the light emission efficiency. Moreover, due to the variation in the distance d among the display cells Cij in a surface of the plasma display panel 16, stable discharge between the X electrode 1 and the Y electrode 2 is not feasible.

In this embodiment, as shown in FIG. 3, the distance d between the X electrode 1 and the Y electrode 2 continuously varies within the range from d1 to d2 in one discharge space. As a result, as for the pd product, a predetermined range R1 near the Paschen minimum MIN becomes an operation range. Consequently, even if the pd product varies among the display cells Cij due to the manufacturing variation in the distance d, the variation can be absorbed, which allows stable discharge between the X electrode 1 and the Y electrode 2.

Figure 6:
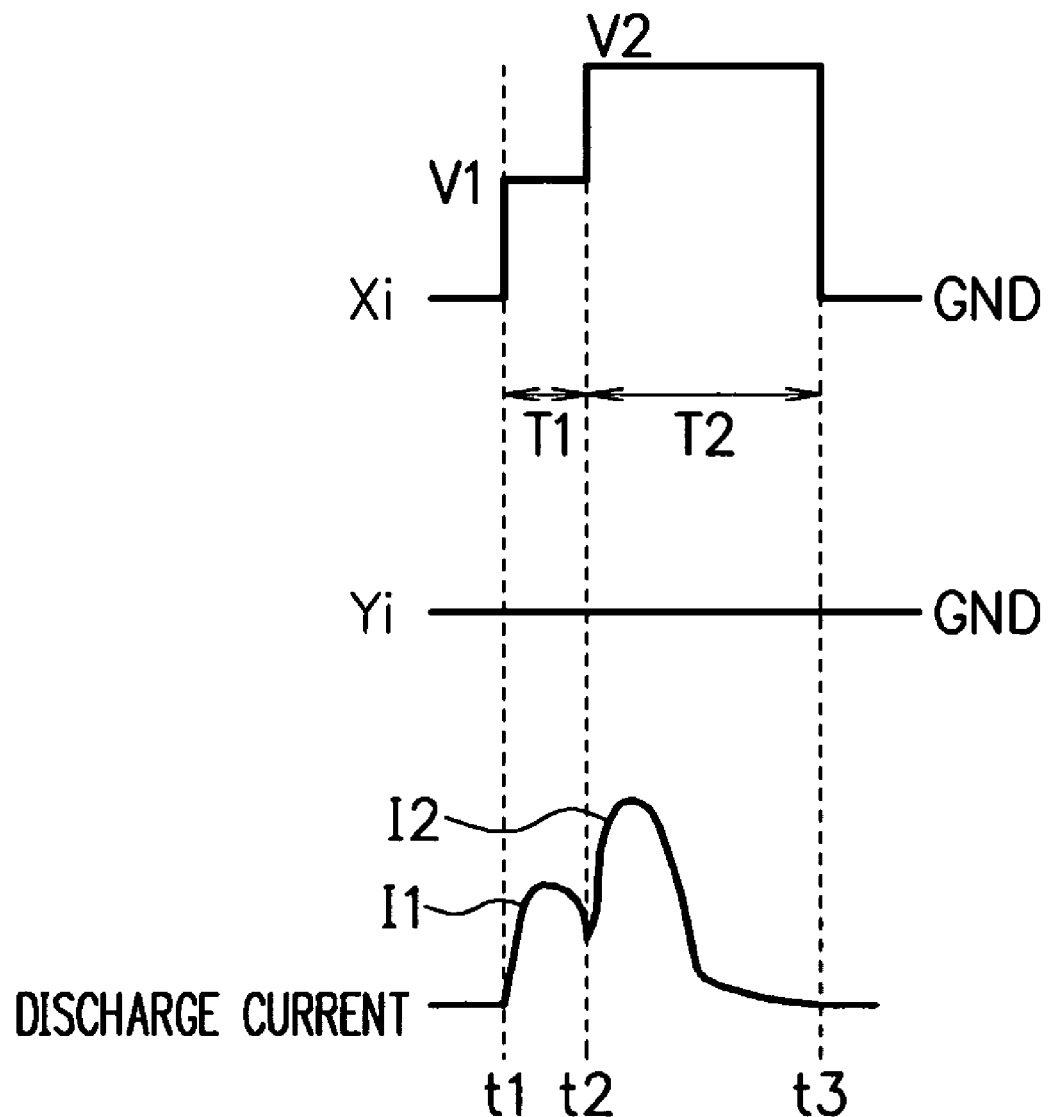
FIG. 6 is a waveform chart of a two-stage sustain discharge pulse according to this embodiment.

FIG. 6 is a waveform chart of a two-stage sustain discharge pulse according to this embodiment. This sustain discharge pulse is a pulse applied between the X electrode Xi and the Y electrode Yi in the sustain period Ts in FIG. 4. The Y electrode Yi is maintained at ground GND. The voltage of the Y electrode Yi is not limited to the ground GND but may be a constant voltage such as a negative voltage.

A two-stage sustain discharge pulse that rises in two stages is applied to the X electrode Xi. At a time t1, the voltage of the X electrode Xi rises from the ground GND to a voltage V1 and the X electrode Xi is maintained at the voltage V1. Next, at a time t2, the voltage of the X electrode Xi rises from the voltage V1 to a voltage V2 and the X electrode Xi is maintained at the voltage V2. Here, the voltage V2 is a voltage higher than the voltage V1. Next, at a time t3, the voltage of the X electrode Xi falls from the voltage V2 to the ground GND and the X electrode Xi is maintained at the ground GND. This sustain discharge pulse rises in two stages. An application time T1 of a first-stage voltage is a period of time between the time t1 at which the pulse makes the first-stage rise and the time t2 at which the maintenance of the voltage V1 ends. An application time T2 of a second-stage voltage is a period of time between the time t2 at which the pulse makes the second-stage rise and the time t3 at which the maintenance of the voltage V2 ends. The application time T2 of the second-stage voltage is longer than the application time T1 of the first-stage voltage. The application T1 of the first-stage voltage is preferably within 0.5 μs.

A discharge current corresponds to light intensity. The first-stage voltage V1 of the sustain discharge pulse causes weak discharge I1 and the second-stage voltage V2 causes main discharge I2. The two-stage sustain discharge pulse improves light emission efficiency, which makes it possible to reduce streaking. Specifically, dividing the discharge into the two stages results in a reduced discharge peak. Accordingly, it is possible to reduce saturation of ultraviolet light emission and the phosphors to improve the light emission efficiency. Moreover, owing to the low discharge peak, voltage drop of an electrode resistor becomes small, so that it is possible to reduce streaking ascribable to a voltage drop difference among the display cells.

The streaking will be described. When the number of pixels that are lighted simultaneously in one line is large, the voltage drop by the resistors becomes large, so that light emission of the lighted pixels becomes dark. On the other hand, when the number of pixels that are lighted simultaneously in one line is small, the light emission of the lighted pixels becomes relatively bright. Thus, even in the display with the same tone value, brightness differs depending on each line. The larger this difference is, the larger % display of the streaking is, which is not preferable. This is a problem of the streaking.

Incidentally, when the two-stage sustain discharge pulse is applied to the X electrode Xi while the voltage of the Y electrode Yi is maintained at the ground GND, the discharge occurs between the X electrode Xi and the Y electrode Yi. Thereafter, when, conversely, the two-stage sustain discharge pulse is applied to the Y electrode Yi while the voltage of the X electrode Xi is maintained at the ground GND, the discharge can occur between the electrode Xi and the Y electrode Yi. By repeating these operations, it is possible to cause the sustain discharge between the X electrode Xi and the Y electrode Yi.

First, a case where the distance d between the X electrode 1 and the Y electrode 2 in FIG. 3 is supposed to be a constant value will be described. As shown in the Paschen's law in FIG. 5, the discharge start voltage differs depending on each display cell Cij in the same plasma display panel due to the manufacturing variation in the distance d. As a result, in the display cell Cij where the distance d is large, the first-stage voltage V1 does not cause the discharge to start and the discharge peak of the discharge at the second-voltage V2 becomes high. Conversely, in the display cell Cij where the distance d is small, the first-stage voltage Vi causes too large discharge, so that sufficient discharge cannot be caused by the second-stage voltage V2. Therefore, the effects of improving the light emission efficiency and reducing the streaking cannot be obtained.

In this embodiment, as shown in FIG. 3, the distance d between the X electrode 1 and the Y electrode 2 continuously varies within the range from d1 to d2 in one discharge space, which allows the operation in the range R1 near the Paschen minimum MIN in FIG. 5. Consequently, even if the pd product varies among the display cells Cij due to the manufacturing variation in the distance d, the variation can be absorbed, which allows stable two-stage discharge between the X electrode 1 and the Y electrode 2. That is, owing to the usability in the discharge start voltage range R1 where dependency on the distance d is small, the variation among the display cells Cij is absorbed, allowing the stable first-stage weak discharge I1 of the two-stage discharge and similarly allowing the stable second-stage main discharge I2. In addition, a lower voltage suffices for causing the two-stage discharge. At this time, the application time T2 of the second-stage voltage is made longer than the application time T1 of the first-stage voltage, so that the polarity of wall charges of the X electrode 1 and the Y electrode 2 can be stably inverted at the time of the sustain discharge, resulting in an improved operation margin.

FIG. 7A is a circuit diagram showing a configuration example of a clamp circuit for two-stage discharge having a voltage source of two-value voltages, and FIG. 7B is a timing chart showing its circuit operations. This clamp circuit for two-stage discharge, which corresponds to the X driving circuit 17 in FIG. 1, has a voltage source of the first voltage V1 and the second voltage V2 which are different from each other, and supplies the two-stage sustain discharge pulse to the X electrode Xi. The X electrode Xi and the Y electrode Yi are connected via a panel capacitor. Note that, though the clamp circuit for two-stage discharge in the X driving circuit 17 will be described as an example, the Y driving circuit 18 also has a similar clamp circuit for two-stage discharge to supply the two-stage sustain discharge pulse to the Y electrode Yi.

First, the circuit configuration in FIG. 7A will be described. A switch SW1 is connected between the voltage V1 and an anode of a diode 701. A cathode of the diode 701 is connected to the X electrode Xi. A switch SW2 is connected between the voltage V2 and the X electrode Xi. A switch SW3 is connected between the ground GND and the X electrode Xi.

Next, operations of generating the two-stage sustain discharge pulse will be described with reference to FIG. 7B. Before a time t1, the switches SW1, SW2 are off and the switch SW3 is on. The voltage of the X electrode Xi is the ground GND. Next, at the time t1, the switch SW1 turns on and the switch SW3 turns off. The X electrode Xi is clamped to the voltage V1. The voltage of the X electrode Xi rises from the ground GND to the voltage V1 and the X electrode Xi is maintained at the voltage V1. Next, at a time t2, the switch SW2 turns on. The X electrode Xi is clamped to the voltage V2. The voltage of the X electrode Xi rises from the voltage V1 to the voltage V2 and the X electrode Xi is maintained at the voltage V2. Thereafter, the switch SW1 turns off. Next, at a time t3, the switch SW2 turns off and the switch SW3 turns on. The X electrode Xi is clamped to the ground GND. The voltage of the X electrode Xi falls from the voltage V2 to the ground GND and the X electrode Xi is maintained at the ground GND. This sustain discharge pulse rises in two stages and falls in one stage.

As described above, this clamp circuit for two-stage discharge clamps the voltage to the first voltage V1 of the voltage source to generate the first-stage voltage of the sustain discharge pulse, and clamps the voltage to the second voltage V2 of the voltage source to generate the second-stage voltage of the sustain discharge pulse.

Figure 8A:
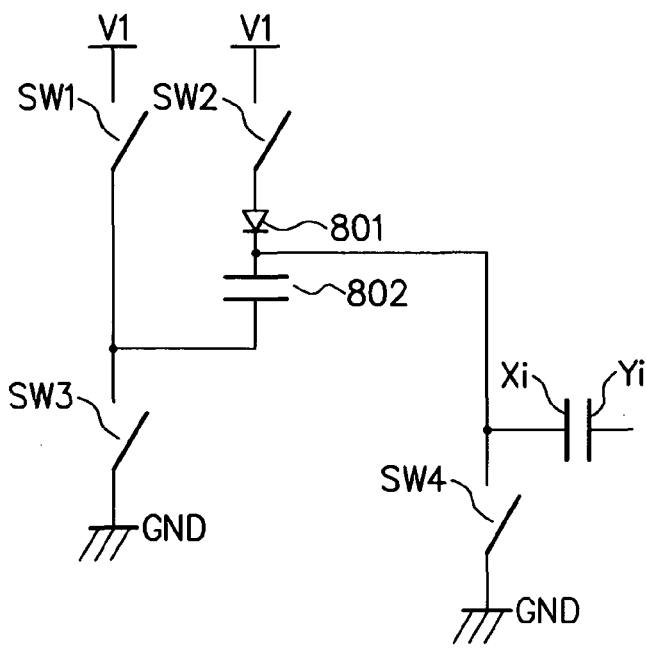
FIG. 8A is a circuit diagram showing a configuration example of a clamp circuit for two-stage discharge having a voltage source of a one-value voltage.
Figure 8B:
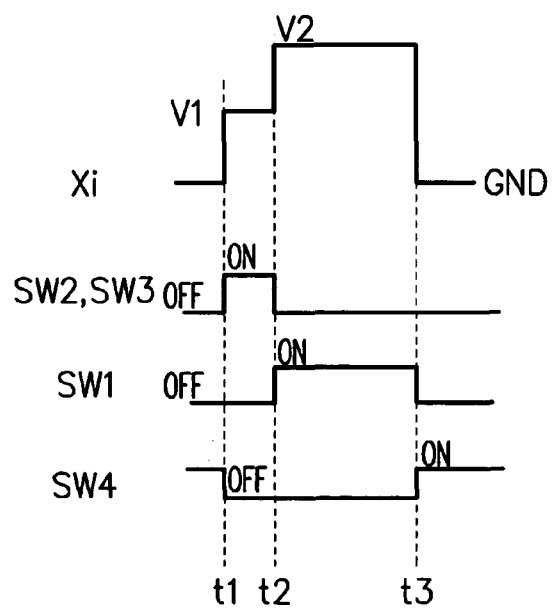
FIG. 8B and FIG. 8C are timing charts showing its circuit operations.
Figure 8C:
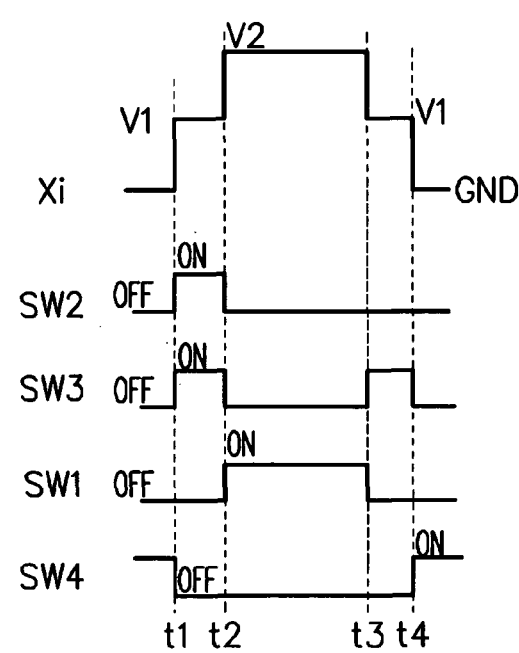

FIG. 8A is a circuit diagram showing a configuration example of a clamp circuit for two-stage discharge having a voltage source of a one-value voltage, and FIG. 8B and FIG. 8C are timing charts showing its circuit operations. This clamp circuit for two-stage discharge has a voltage source of the one-value voltage V1 and replaces the clamp circuit for two-stage discharge in FIG. 7A.

First, the circuit configuration in FIG. 8A will be described. A switch SW1 is connected between the voltage V1 and a lower end of a capacitor 802. A switch SW2 is connected between the voltage V1 and an anode of a diode 801. A cathode of the diode 801 is connected to the X electrode Xi. An upper end of a capacitor 802 is connected to the X electrode Xi. A switch SW3 is connected between the ground GND and a lower end of the capacitor 802. A switch SW4 is connected between the ground GND and the X electrode Xi.

Next, operations of generating the sustain discharge pulse that rises in two stages and falls in one stage will be described with reference to FIG. 8B. Before a time t1, the switches SW1, SW2, SW3 are off and the switch SW4 is on. The voltage of the X electrode Xi is the ground GND. Next, at the time t1, the switches SW2, SW3 turn on and the switch SW4 turn off. The capacitor 802 is charged to the voltage V1 from the ground GND. The voltage of the X electrode Xi rises from the ground GND to the voltage V1 and the X electrode is maintained at the voltage V1. Next, at a time t2, the switch SW1 turns on and the switches SW2, SW3 turn off. In the capacitor 802, the voltage of an upper electrode becomes the voltage V2 (=V1+V1) since the voltage of a lower electrode becomes the voltage V1 of the voltage source. The voltage of the X electrode Xi rises from the voltage V1 to the voltage V2 and the X electrode Xi is maintained at the voltage V2. Next, at a time t3, the switch SW1 turns off and the switch SW4 turns on. The voltage of the X electrode Xi falls from the voltage V2 to the ground GND and the X electrode Xi is maintained at the ground GND. This sustain discharge pulse rises in two stages and falls in one stage.

Next, operations of generating a sustain discharge pulse that rises in two stages and falls in two stages will be described with reference to FIG. 8C. Before a time t1, the switches SW1, SW2, SW3 are off and the switch SW4 is on. The voltage of the X electrode Xi is the ground GND. Next, at the time t1, the switches SW2, SW3 turn on and the switch SW4 turns off. The capacitor 802 is charged to the voltage V1 from the ground GND. The voltage of the X electrode Xi rises from the ground G to the voltage V1 and the X electrode Xi is maintained at the voltage V1. Next, at a time t2, the switch SW1 turns on and the switches SW2, SW3 turn off. In the capacitor 802, the voltage of the upper electrode becomes the voltage V2 (=V1+V1) since the voltage of the lower electrode becomes the voltage V1 of the voltage source. The voltage of the X electrode Xi rises from the voltage V1 to the voltage V2 and the X electrode Xi is maintained at the voltage V2. Next, at a time t3, the switch SW1 turns off and the switch SW3 turns on. In the capacitor 802, since the voltage of the lower electrode becomes the ground GND, the voltage of the upper electrode becomes the voltage V1. The voltage of the X electrode Xi falls from the voltage V2 to the voltage V1 and the X electrode Xi is maintained at the voltage V1. Next, at a time t4, the switch SW3 turns off and the switch SW4 turns on. The voltage of the X electrode Xi falls from the voltage V1 to the ground GND and the X electrode Xi is maintained at the ground GND. This sustain discharge pulse rises in two stages and falls in two stages.

As described above, this clamp circuit for two-stage discharge has the voltage source of the one-value voltage V1 to generate the first-stage rising voltage of the sustain discharge pulse by using the voltage V1 of the voltage source and to generate the second-stage rising voltage V2 (=V1+V1) by adding the voltage V1 of the voltage source to the first-stage voltage V1.

FIG. 9A is a circuit diagram showing a configuration example of a clamp circuit for two-stage discharge utilizing LC resonance. FIG. 9B is a timing chart showing its circuit operations. This clamp circuit for two-stage discharge replaces the clamp circuits for two-stage discharge in FIG. 7A and FIG. 8A.

First, the circuit configuration in FIG. 9A will be described. A switch SW2 is connected between the voltage V1 and the X electrode Xi. A switch SW4 is connected between the ground GND and the X electrode Xi. A coil 906 is connected between an anode of a diode 904 and the X electrode Xi. A cathode of the diode 904 is connected to the voltage V1. A diode 905 is connected to the ground at its anode and connected to the anode of the diode 904 at its cathode. A cathode of a diode 902 and an anode of a diode 903 are connected to the anode of the diode 904. A switch SW1 is connected between an upper end of a capacitor 901 and an anode of the diode 902. A switch SW3 is connected between the upper end of the capacitor 901 and a cathode of the diode 903. A lower end of the capacitor 901 is connected to the ground GND.

Next, operations of generating a two-stage sustain discharge pulse utilizing the LC resonance will be described with reference to FIG. 9B. Before a time t1, the switches SW1, SW2, SW3 are off and the switch 4 is on. The voltage of the X electrode Xi is the ground GND. Next, at the time t1, the switch SW1 turns on and the switch SW4 turns off. The capacitor 901 has been charged to a voltage approximate to the voltage V1, which will be described later. Due to LC resonance of the coil 906, the capacitor 901, and a panel capacitor, the voltage of the X electrode Xi rises from the ground GND to the voltage approximate to the voltage V1. Next, at a time t2, the switch SW2 turns on. The X electrode Xi is clamped to the voltage V1. Thereafter, the switch SW1 turns off. Next, at a time t3, the switch SW2 turns off and the switch SW3 turns on. Due to the LC resonance of the coil 906, the capacitor 901, and the panel capacitor, the voltage of the X electrode Xi falls from the voltage V1 to the voltage approximate to the ground GND. Power of the X electrode Xi is recovered in the capacitor 901, so that the capacitor 901 is charged to the voltage approximate to the voltage V1. Next, at a time t4, the switch SW4 turns on. The X electrode Xi is clamped to the ground GND. Thereafter, the switch SW3 turns off. This sustain discharge pulse rises in two stages and falls in two stages. The sustain discharge pulse is repeated a plurality of times. Power is recovered in a period from the time t3 to the time t4 and the recovered power is consumed in a period from the time t1 to the time t2 in a subsequent cycle, which can reduce power consumption.

As described above, this clamp circuit for two-stage discharge generates the first-stage voltage of the sustain discharge pulse by an LC resonant circuit and generates the second-stage voltage by the clamp circuit.

Figure 11:
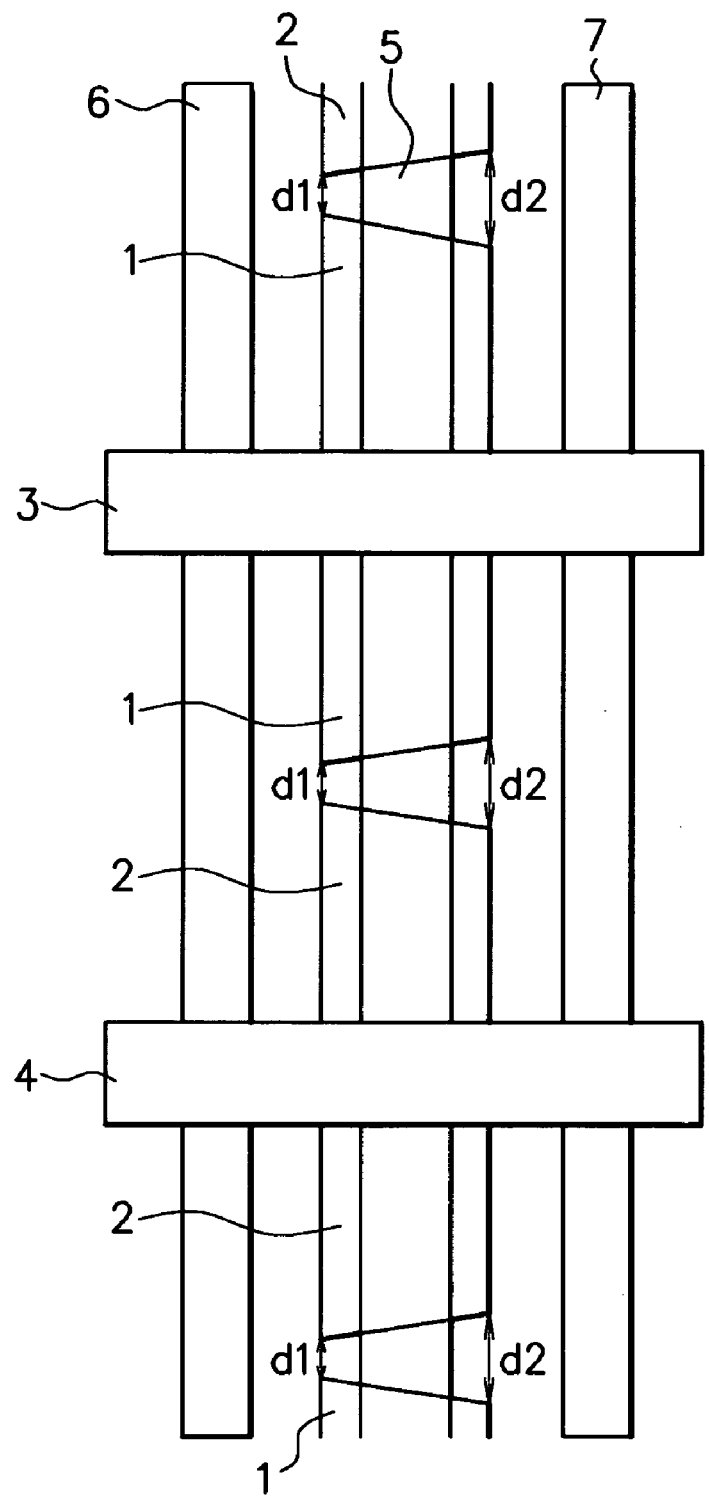
FIG. 11 is a partial plane view showing a structural example of the ALIS panel.

FIG. 10 is an exploded partial perspective view showing a structural example of an ALIS panel 16, and FIG. 11 is a partial plane view showing the structural example of the ALIS panel 16. This embodiment is also applicable to the ALIS panel. Differences between the panel shown in FIG. 2 and FIG. 3 and the panel shown in FIG. 10 and FIG. 11 will be described.

First, the progressive panel in FIG. 2 and FIG. 3 will be described. The X light-transmissive electrode 1 is connected only to a lower side in FIG. 3 of the X pulse electrode 3, and the Y light-transmissive electrode 2 is connected only to an upper side in FIG. 3 of the Y bus electrode 4. The distance between the X electrode 1 and the Y electrode 2 continuously varies within the range from the minimum value d1 to the maximum value d2 in one discharge space. Specifically, the plural sets of the X electrode Xi and the Y electrode Yi are provided, and the X electrodes Xi and the Y electrodes Yi are alternately arranged. The sustain discharge from each of the Y electrodes Yi can occur only to the adjacent X electrode Xi on one side, and the sustain discharge from each of the X electrodes Xi can occur only to the adjacent Y electrode Yi on one side.

Next, the ALIS panel in FIG. 10 and FIG. 11 will be described. An X light-transmissive electrode 1 is connected both to an upper side and a lower side in FIG. 11 of an X bus electrode 3, and a Y light-transmissive electrode 2 is connected both to an upper side and a lower side in FIG. 11 of a Y bus electrode 4. On both the upper and lower sides, a distance between the X electrode 1 and the Y electrode 2 continuously varies within a range from a minimum value d1 to a maximum value d2 in one discharge space. Specifically, the plural sets of the X electrode Xi and the Y electrode Yi are provided, and the X electrodes Xi and the Y electrodes Yi are alternately arranged. Distances from the Y electrode Yi to the adjacent X electrodes Xi on both sides continuously vary in one discharge space, and the sustain discharge from each of the Y electrodes Yi can occur to the adjacent X electrodes Xi on both sides. Similarly, distances from the X electrode Xi from the adjacent Y electrodes Yi on both sides continuously vary in one discharge space, and the sustain discharge from the X electrode Xi can occur to the adjacent Y electrodes Yi on both sides. Note that the sustain discharge from the X electrode Xi occurs to the adjacent Y electrode Yi on one side in a first field, and the sustain discharge therefrom occurs to the adjacent Y electrode Yi on the other side in a second field different from the first field in terms of time.

As described above, according to this embodiment, supposing that one of the X electrode Xi and the Y electrode Y1 is defined as a first electrode and the other is defined as a second electrode, the distance (a slit width) between the first and second electrodes continuously varies in one discharge space, and the sustain discharge is caused between the first and second electrodes. When the sustain discharge pulse that rises in two stages is to be applied between the first and second electrodes to cause the sustain discharge, the sustain discharge pulse in which the application time of the second-stage voltage is longer than the application time of the first-stage voltage is generated.

Consequently, even if there exists variation in the pd product among the display cells Cij due to the manufacturing variation in the distance d between the first and second electrodes, the variation can be absorbed, which allows stable two-stage discharge between the first and second electrodes. Specifically, owing to the usability in the discharge start voltage range R1 where dependency on the distance d is small, the variation among the display cells Cij can be absorbed to allow the stable first-stage weak discharge I1 of the two-stage discharge, and similarly, to allow the stable second-stage main discharge I2. This can improve light emission efficiency. Further, a lower voltage suffices for causing the second-stage discharge, so that the voltage of the sustain discharge pulse can be lowered. At this time, the application time T2 of the second-stage voltage is made longer than the application time T1 of the first-stage voltage, so that the polarity of the wall charges of the first and second electrodes can be stably inverted at the time of the sustain discharge, resulting in an improved operation margin.

Since the distance between the first and second electrodes continuously varies in one discharge space, even if there exists manufacturing variation in the distance between the first and second electrodes among the display cells, it is possible to absorb the variation at the time of the discharge between the first and second electrodes, allowing stable two-stage discharge between the first and second electrodes. Consequently, light emission efficiency can be improved, which makes it possible to lower the voltage of the sustain discharge pulse. Further, since the application time of the second-stage voltage of the sustain discharge pulse is longer than the application time of the first-stage voltage of the sustain discharge pulse, the polarity of the wall charges of the first and second electrodes can be stably inverted at the time of the sustain discharge, realizing an improved operation margin.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A plasma display device comprising:
    a first bus electrode and a second bus electrode which extend in a first direction and are adjacently disposed;
    a first display electrode which connects to the first bus electrode, extends from the first bus electrode to the second bus electrode, and has one substantially rectangular form in one discharge space;
    a second display electrode which connects to the second bus electrode, extends from the second bus electrode to the first bus electrode, and has one substantially rectangular form in one discharge space, and causes sustain discharge to the first display electrode;
    a driving circuit applying a sustain discharge pulse that rises from low voltage to high voltage in two stages in between the first display electrode connected to the first bus electrode and the second display electrode connected to the second bus electrode,
    wherein an interelectrode distance in an area where the first display electrode faces the second display electrode varies so as to either increase or decrease continuously in one discharge space and the interelectrode distance includes an interelectrode distance to satisfy a Paschen minimum where a discharge start voltage becomes a minimum value, and
    wherein, when applying the sustain discharge pulse and causing a first sustain discharge by the low voltage of the sustain discharge pulse and a second sustain discharge being stronger than the first sustain discharge by the high voltage of the sustain discharge pulse, the driving circuit sets an application time of the low voltage of the sustain discharge pulse within 0.5 µs, and sets an application time of the high voltage of the sustain discharge pulse longer than the application time of the low voltage of the sustain discharge pulse.

2. The plasma display device according to claim 1, wherein the sustain discharge pulse that rises in the two stages falls in one stage.

3. A method of driving a plasma display panel including,
    a first bus electrode and a second bus electrode which extend in a first direction and are adjacently disposed;
    a first display electrode which connects to the first bus electrode, extends from the first bus electrode to the second bus electrode, and has one substantially rectangular form in one discharge space;
    a second display electrode which connects to the second bus electrode, extends from the second bus electrode to the first bus electrode, and has one substantially rectangular form in one discharge space, and causes sustain discharge to the first display electrode,
    an interelectrode distance in an area where the first display electrode faces the second display electrode varying so as to either increase or decrease continuously in one discharge space and interelectrode distance to satisfy a Paschen minimum where a discharge start voltage becomes a minimum value,
    the method comprising a driving operation,
    wherein, when applying a sustain discharge pulse that rises in two stages from low voltage to high voltage between said first and second display electrodes and causing a first sustain discharge by the low voltage of the sustain discharge pulse and a second sustain discharge being stronger than the first sustain discharge by the high voltage of the sustain discharge pulse, the driving operation generates the sustain discharge pulse setting an application time of the low voltage of the sustain discharge pulse within 0.5 µs, and setting an application time of the high voltage of the sustain discharge pulse longer than the application time of the sustain discharge pulse.

4. The method of driving the plasma display device according to claim 3, wherein the sustain discharge pulse that rises in the two stages falls in one stage.

5. The plasma display device according to claim 1, wherein each said first and second electrode substantially are form of rectangular shape.

6. The method according to claim 3, wherein each said first and second electrode substantially are form of rectangular shape.

* * * * *